P. Stone,
Box Opener.
N° 74,167. Patented Feb. 4, 1868.
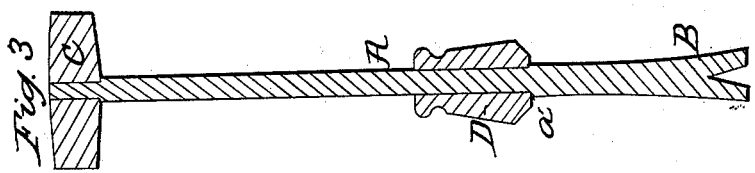
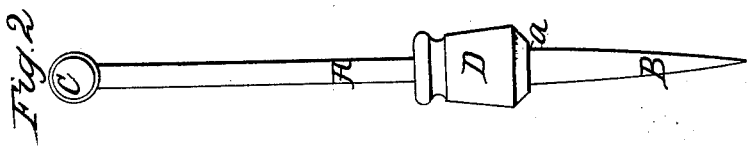
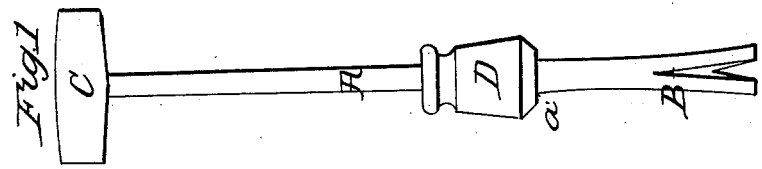
Witnesses
S. N. Piper
Lauritz Möller
Inventor.
Paschal Stone
by his attorney
R. H. Eddy

United States Patent Office.

PASCHAL STONE, OF CHARLESTOWN, ASSIGNOR TO JOSEPH VEAZIE AND AUGUSTUS L. DOLE, OF BOSTON, MASSACHUSETTS.

*Letters Patent No. 74,167, dated February 4, 1868.*

IMPROVEMENT IN BOX-OPENERS.

*The Schedule referred to in these Letters Patent and making part of the same.*

TO ALL PERSONS TO WHOM THESE PRESENTS MAY COME:

Be it known that I, PASCHAL STONE, of Charlestown, in the county of Middlesex, and State of Massachusetts, have invented a new and useful Implement for Opening Boxes, &c.; and I do hereby declare the same to be fully described in the following specification, and represented in the accompanying drawings, of which—

Figure 1 is a front view,

Figure 2 an edge elevation, and

Figure 3 a longitudinal section of it.

In such drawings, A is a shank, terminating at one end in a furcated, chisel-shaped claw, B, and at the other in a hammer-head or handle, C. A shoulder, a, is formed on the shank, near the claw, such shoulder being for the reception of the blows of a ram or weight, D, which encompasses the shank, and slides freely longitudinally thereon.

In using the implement for opening a box or separating the cover from the body of the box, when the two are connected by nails, we have only to place the furcated claw on the joint, and drive it therein by means of the ram, made as a hammer, to operate against the shoulder. Next, by using the implement as a lever, we can pry up the cover so as to start the nails. The furcated claw also answers to draw spikes or nails from wood. The hammer-head, besides answering the purpose of a handle, will also enable the instrument to be used as a hammer to drive nails.

I do not claim an ice-pick provided with a driving-ram or weight.

I am aware of the box-opener for which Dexter H. Chamberlain applied for a patent in 1857, and which was rejected on January 24, 1857, such consisting of a chisel, provided with a simple, round head and collar or shoulder fixed on its shank, and also having a weight to encompass such shank, and play or slide thereon between the head and collar or shoulder; therefore I make no claim to this. The differences between my implement and that are as follows: First, I employ at one end of the shank a furcated claw, to span the head of a nail and aid in effecting its extraction; and, second, I fix to the other end of the shank a hammer-head, which not only serves the purpose of a handle to enable a person to hold the implement to advantage, but renders the instrument a hammer, to be used in drawing a nail or for other purposes; therefore I have an implement of more utility, and containing features not found in those hereinbefore mentioned.

I therefore claim as my invention, a box-opener substantially as described, viz, as constructed with a claw at one end of its stock or shank, and a hammer-head at the other end thereof, and with a ram to slide on the shank or stock, in manner and against a shoulder thereof, so as to operate the claw as specified.

PASCHAL STONE.

Witnesses:
W. H. RICHARDSON,
R. H. SHELTON.